(12) United States Patent
Yoshida et al.

(10) Patent No.: US 10,562,140 B2
(45) Date of Patent: Feb. 18, 2020

(54) PRESS-FITTING JIG FOR COVER CAP OF BOLT MOUNTING HOLE

(71) Applicant: THK CO., LTD., Tokyo (JP)

(72) Inventors: Akimasa Yoshida, Tokyo (JP); Hiroyuki Kishi, Tokyo (JP); Satoshi Kashiwagura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/064,610

(22) PCT Filed: Jan. 12, 2017

(86) PCT No.: PCT/JP2017/000720
§ 371 (c)(1),
(2) Date: Jun. 21, 2018

(87) PCT Pub. No.: WO2017/126396
PCT Pub. Date: Jul. 27, 2017

(65) Prior Publication Data
US 2019/0076972 A1  Mar. 14, 2019

(30) Foreign Application Priority Data

Jan. 19, 2016 (JP) .................. 2016-007624

(51) Int. Cl.
| F16C 29/06 | (2006.01) |
| F16C 29/00 | (2006.01) |
| B23P 19/02 | (2006.01) |
| F16C 29/08 | (2006.01) |
| F16B 4/00 | (2006.01) |

(Continued)

(52) U.S. Cl.
CPC ............ B23P 19/02 (2013.01); F16C 29/004 (2013.01); F16C 29/005 (2013.01);
(Continued)

(58) Field of Classification Search
CPC .. F16C 29/004; F16C 29/082; F16C 29/0647; F16C 2226/12; F16C 29/0609;
(Continued)

(56) References Cited

U.S. PATENT DOCUMENTS 1,465,302 A * 8/1923 Haskel .................. E05C 17/54
292/343
1,934,680 A * 11/1933 Bosco ...................... B25D 1/04
254/26 R
(Continued)

FOREIGN PATENT DOCUMENTS

DE       4421444      *  6/1994
EP       1 854 588 A1    11/2007
(Continued)

OTHER PUBLICATIONS

INA Linear Technology Catalog (Year: 2007).*
(Continued)

*Primary Examiner* — Monica S Carter
*Assistant Examiner* — Mahdi H Nejad
(74) *Attorney, Agent, or Firm* — Westerman, Hattori, Daniels & Adrian, LLP; John P. Kong

(57) ABSTRACT

A press-fitting jig for a closure cap which is configured to press-fit a closure cap into a bolt mounting hole formed in a track rail of a guide device. The press-fitting jig is mounted to a moving block, which is assembled to the track rail through intermediation of a plurality of rolling elements and is configured to move on the track rail. The press-fitting jig includes: a finishing surface which is brought into slide contact with an upper surface of the track rail having the bolt mounting hole opened therein; and a guide surface, which is formed adjacent to the finishing surface and forms a wedge-shaped space with the track rail in a longitudinal direction of the track rail, the guide surface being configured to push the (Continued)

closure cap temporarily placed in the bolt mounting hole into the bolt mounting hole along with movement of the moving block.

4 Claims, 6 Drawing Sheets

(51) Int. Cl.
    *F16B 37/14*     (2006.01)

(52) U.S. Cl.
    CPC ...... *F16C 29/0609* (2013.01); *F16C 29/0647* (2013.01); *F16C 29/08* (2013.01); *F16C 29/082* (2013.01); *F16B 4/004* (2013.01); *F16B 37/14* (2013.01); *F16C 2226/12* (2013.01)

(58) Field of Classification Search
    CPC ...... F16C 29/088; F16C 29/005; F16B 37/14; F16B 4/004; B23P 19/02; F01D 5/3038
    USPC ............. 254/42, 24, 324, 18; 81/20, 23, 463
    See application file for complete search history.

(56) References Cited

U.S. PATENT DOCUMENTS

| | | | | |
|---|---|---|---|---|
| 2,327,297 | A | * | 8/1943 | Woodruff ................ B25B 27/02 254/104 |
| 7,946,013 | B2 | | 5/2011 | Kumagai |
| 9,771,976 | B2 | | 9/2017 | Kawakami |
| 2002/0018602 | A1 | * | 2/2002 | Kato ...................... F16C 29/064 384/45 |
| 2009/0214143 | A1 | * | 8/2009 | Rudy .................... F16C 29/002 384/43 |
| 2013/0126807 | A1 | * | 5/2013 | Lombardi ................ B25G 1/10 254/26 R |
| 2016/0176030 | A1 | * | 6/2016 | Thomas ................ F16C 29/082 384/7 |

FOREIGN PATENT DOCUMENTS

| | | | |
|---|---|---|---|
| JP | 5-138428 | A | 6/1993 |
| JP | 05138428 | * | 6/1993 |
| JP | 2003-28160 | A | 1/2003 |
| JP | 2007056991 | * | 2/2010 |
| WO | 2007/063706 | A1 | 6/2007 |
| WO | 2015-033486 | A1 | 3/2015 |

OTHER PUBLICATIONS

International Search Report dated Apr. 4, 2017, issued in counterpart International Application No. PCT/JP2017/000720 (2 pages).
Decision to Grant a Patent dated Aug. 22, 2017, issued in counterpart of Japanese Patent Application No. 2016-007624 with English Translation (6 pages).

* cited by examiner

PRESS-FITTING JIG FOR COVER CAP OF BOLT MOUNTING HOLE

TECHNICAL FIELD

The present invention relates to a jig to be used for firmly fitting a closure cap into a bolt mounting hole formed in a track rail of a guide device, which is used at a linear guide portion or a curved guide portion of working tools or various industrial robots, at the time of installing the guide device on a base portion such as a bed or a column of a mechanical device.

BACKGROUND ART

Hitherto, as a guide device serving as a guide portion of machine tools or various industrial robots, there has been known a guide device including a track rail, which has a linear shape or an arc shape and has a raceway surface for balls along a longitudinal direction, and a moving block, which is assembled to the track rail through intermediation of a plurality of balls. The moving block includes a load raceway surface opposed to the raceway surface of the track rail, and includes a circulation path for endlessly circulating the large number of balls which roll while bearing a load between the load raceway surface and the raceway surface of the track rail. Through circulation of the balls in the endless circulation path, the moving block can continuously move along an entire length of the track rail.

Typically, the track rail is fixed to a base portion such as a bed or a column of, for example, a machine tool by fastening of fixing bolts. Therefore, the track rail has bolt mounting holes penetrating therethrough, which are arrayed at predetermined intervals along a longitudinal direction of the track rail and are configured to allow the fixing bolts to be inserted therethrough. When a head portion of the fixing bolt projects on the track rail, movement of the moving block along the track rail is hindered. Therefore, an inside of the bolt mounting hole has two stages including a small-diameter portion and a large-diameter portion. The small-diameter portion has an inner diameter which is slightly larger than a nominal diameter of the bolt. The large-diameter portion has an inner diameter which is slightly larger than the bolt head portion. That is, the large-diameter portion serves as a receiving portion for the bolt head portion to prevent the bolt head portion from projecting on the surface of the track rail.

Meanwhile, in order to prevent entry of a foreign object adhering to the track rail into the moving block, seal members which are brought into slide contact with the track rail are provided in a periphery of the moving block. Those seal members remove the foreign object adhering to the surface of the track rail along with movement of the moving block. However, when the bolt mounting holes are formed in the track rail, the foreign object may enter the moving block through the bolt mounting holes. Moreover, the seal members are held in contact with the surface of the track rail with a certain degree of a fastening force. Therefore, when the bolt mounting holes are present, distal end portions of the seal members are abraded by opening edges of the bolt mounting holes, which may disadvantageously cause degradation of the seal members in an early stage.

Therefore, when the guide device is to be used in an environment in which the foreign object is liable to adhere to the track rail, for example, as disclosed in Patent Literature 1, closure caps are press-fitted into the bolt mounting holes of the track rail to close the bolt mounting holes with the closure caps. As a specific method of press-fitting, the following method is employed. A distal end of the closure cap is gently pressed into the bolt mounting hole, and a back plate is placed on the closure cap. The back plate is repeatedly hit with a tool such as a hammer to completely embed the closure cap in the bolt mounting hole. With such method, an upper surface of the closure cappress-fitted into the bolt mounting hole forms a surface in flush with a surface of the track rail. With this, enhancement in sealing between the seal members and the track rail is expected.

CITATION LIST

Patent Literature
[PTL 1] WO 2015/033486 A1

DISCLOSURE OF THE INVENTION

Problems to be Solved by the Invention

However, in the related-art method of simply hitting the closure cap into the bolt mounting hole through intermediation of the back plate, depending on a way of swinging down the tool such as a hammer, the closure cap may be press-fitted into the bolt mounting hole in an inclined state, which may result in impairment of the sealing with the seal members. Moreover, a plurality of bolt mounting holes are present along the longitudinal direction of the track rail. Thus, there is a problem in that, when the hitting operation is carefully performed so as to prevent occurrence of the inclination of the closure cap, the operation time for each track rail becomes longer.

Further, when the closure cap is press-fitted into the bolt mounting hole in the inclined state, an outer peripheral portion of the closure cap is slightly shaved at the time of the press-fitting, and there is a possibility of causing shavings (burrs). As a result, it is required that an operation of removing the burrs be performed after the hitting operation.

Means for Solving the Problems

The present invention has been made in view of such problems, and has an object to provide a press-fitting jig for a closure cap, which is capable of promptly and successively press-fitting closure caps into bolt mounting holes formed in a track rail of a guide device without causing operation unevenness and of press-fitting the closure caps into the bolt mounting holes straight without inclination.

That is, according to one embodiment of the present invention, there is provided a jig for press-fitting a closure cap into a bolt mounting hole formed in a track rail of a guide device. The jig is mounted to a moving block, which is assembled to the track rail through intermediation of a plurality of rolling elements and is configured to move on the track rail. The jig includes: a guide surface, which forms a wedge-shaped space with the track rail, and is configured to push the closure cap temporarily placed in the bolt mounting hole into the bolt mounting hole along with movement of the moving block; and a finishing surface, which is formed adjacent to the guide surface, and is configured to be brought into slide contact with the track rail having the bolt mounting hole opened therein.
Effects of the Invention According to one embodiment of the present invention, the closure cap temporarily placed in the bolt mounting hole can be pushed into the bolt mounting hole by only causing the moving block having the jig mounted thereto to move along the track rail, thereby being capable of promptly and successively press-fitting the closure caps into the plurality of bolt mounting holes formed in the track rail.

Moreover, in view of the characteristics of the guide device to which the present invention is applied, the moving block having the jig mounted thereto travels with a constant accuracy relative to the track rail, and hence such accuracy is reflected in the operation of pushing the closure cap by the jig, thereby being capable of press-fitting the plurality of closure caps into the bolt mounting holes straight without operation unevenness.

MODE FOR CARRYING OUT THE INVENTION

Now, detailed description is made of a press-fitting jig according to one embodiment of the present invention for a closure cap of a bolt mounting hole with reference to the accompanying drawings.

Figure 1:
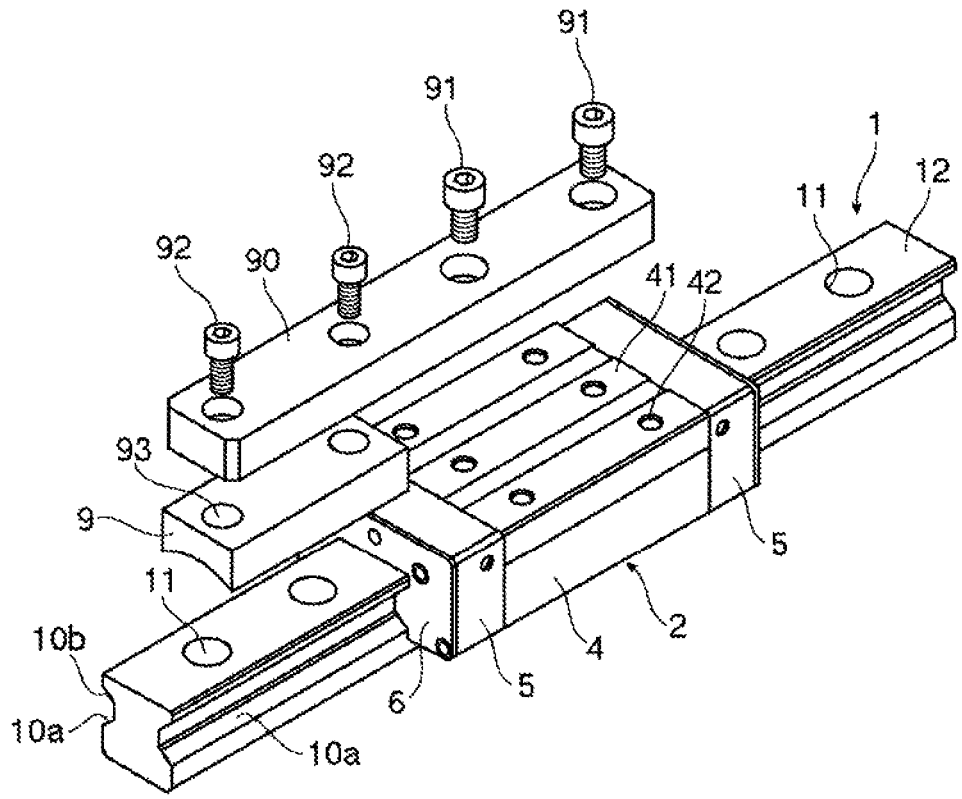
FIG. 1 is a perspective view for illustrating an example of a press-fitting jig to which the present invention is applied and a linear guide device having the press-fitting jig mounted thereto.

FIG. 1 is an illustration of an example of a linear guide device having a jig mounted thereto according to the present invention. This linear guide device includes a track rail 1 and a moving block 2. The track rail 1 is installed on a base portion such as a bed. The moving block 2 is assembled to the track rail 1 through intermediation of a plurality of rolling elements (balls or rollers). The moving block 2 is freely movable on the track rail.

The track rail 1 has a substantially rectangular sectional shape, and a total of four raceway surfaces 10a and 10b on which the rolling elements roll are formed so as to extend along a longitudinal direction of the track rail 1. Two raceway surfaces 10a and 10b are formed on each of both side surfaces of the track rail 1. The raceway surfaces 10a are formed so as to extend obliquely upward, and the raceway surfaces 10b are formed so as to extend obliquely downward. Moreover, bolt mounting holes 11 are formed in the track rail 1 at suitable intervals in the longitudinal direction of the track rail 1. The track rail 1 is fixed on the base portion being a receiving surface by fixing bolts (not shown) inserted into the bolt mounting holes 11.

Meanwhile, the moving block 2 includes a block main body 4 and a pair of cover members 5 and 5. The block main body 4 has a mounting surface 41 for mounting a movable body such as a table and tap holes 42 to which fixing bolts for the movable body are screwed. The pair of cover members 5 and 5 are fixed to both front and rear end surfaces of the block main body 4. The cover members 5 are fixed to the block main body 4 so that an endless circulation path for the rolling elements is formed in the moving block 2. The rolling elements bear loads between the track rail 1 and the block main body 4 while circulating in the endless circulation path. Moreover, seal members 6 which are brought into slide contact with the track rail 1 are mounted to the cover members 5 so that dust adhering to the track rail 1 is prevented from entering the moving block 2 along with the movement of the moving block 2.

Figure 2:
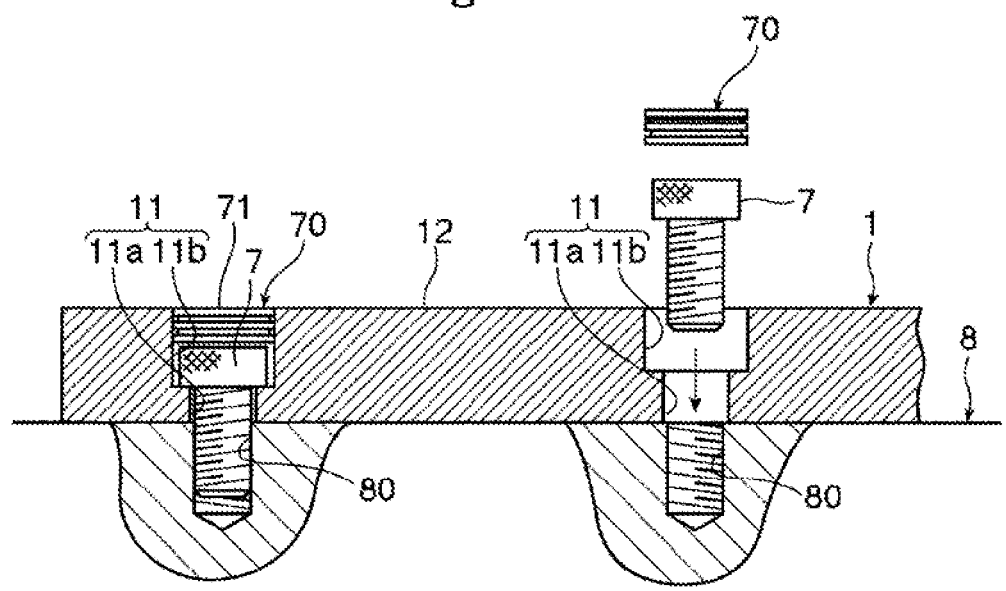
FIG. 2 is a sectional view for illustrating a state in which a track rail is mounted to a base portion.

FIG. 2 is a sectional view for illustrating a state in which the track rail 1 is fixed on the base portion 8 with use of fixing bolts 7. The right-and-left direction in FIG. 2 corresponds to the longitudinal direction of the track rail 1. As illustrated in FIG. 2, the bolt mounting holes 11 for allowing the fixing bolts 7 to be inserted into the track rail 1 each have two stages including a small-diameter portion 11a and a large-diameter portion 11b. Under a state in which the fixing bolt 7 is fastened to a tap hole 80 of the base portion 8, a head portion of the fixing bolt 7 is received in the large-diameter portion lib of the bolt mounting hole 11. Therefore, a bolt having a hexagonal socket is used as the fixing bolt 7.

In order to prevent entry of a foreign object into the bolt mounting hole 11 during the use of the linear guide device, after fastening of the fixing bolts 7 is terminated so that the track rail 1 is fixed to the base portion 8, closure caps 70 each having a disc shape are press-fitted into the bolt mounting holes 11, and the large-diameter portions lib of the bolt mounting holes 11 are closed above the head portions of the fixing bolts 7. With this, close contact of the seal members 6, which are fixed to both front and rear ends of the moving block 2 in the moving direction, with the track rail 1 can be enhanced. Moreover, entry of the foreign object into the moving block 2 from the outside or leakage of lubricant from the inside of the moving block 2 to the outside can be prevented as much as possible. The track rail 1 is made of steel. Therefore, the closure caps 70 are each made of a material having a hardness smaller than that of the track rail 1. For example, synthetic resin such as polyacetal (POM) or metal such as gun metal or aluminum is used.

A maximum outer diameter of the closure cap 70 is set to be slightly larger than an inner diameter of the large-diameter portion lib of the bolt mounting hole 11. When the closure cap 70 is fitted to an opening edge of the bolt mounting hole 11, the closure cap 70 is prevented from sinking into the bolt mounting hole 11, and is held in a state of projecting on the track rail 1. Moreover, when an external force imparted in a direction of pushing the closure cap 70 into the bolt mounting hole 11 is applied to the closure cap 70, the closure cap 70 sinks into the large-diameter portion lib of the bolt mounting hole 11 so that a top surface 71 of the closure cap 70 and an upper surface 12 of the track rail 1 form a continuous flat surface.

The press-fitting jig according to the present invention is used for the purpose of, after fixing the track rail 1 to the base portion 8 with use of the fixing bolts 7, pushing the closure caps 70 into the bolt mounting holes 11 of the track rail 1. FIG. 1 is an exploded perspective view for illustrating a state of mounting the press-fitting jig 9 to the moving block 2. This press-fitting jig 9 is used in a state of being fixed to the moving block 2. Before the moving body is fixed to the mounting surface 41 of the moving block 2, the press-fitting jig 9 is mounted to the moving block 2 with use of the mounting surface 41.

The press-fitting jig 9 is fixed to the moving block 2 with a holding plate 90. The holding plate 90 is elongated along the longitudinal direction of the track rail 1, and is fastened to the mounting surface 41 of the moving block 2 with use of fixing bolts 91. Moreover, the holding plate 90 partially projects from the moving block 2 in a cantilever state and juts out above the track rail 1. The press-fitting jig 9 is fixed to the jutting part with use of mounting bolts 92. That is, the press-fitting jig 9 is held between the holding plate 90 and the track rail 1.

The press-fitting jig 9 has a width substantially equal to that of the track rail 1, and has a substantially rectangular shape elongated along the longitudinal direction of the track rail 1. Tapholes 93 to which the mounting bolts 92 are screwed are formed in an opposed surface of the press-fitting jig 9, which is opposed to the holding plate 90. Moreover, under a state in which the press-fitting jig 9 is fixed to the holding plate 90, the press-fitting jig 9 is held in abutment against the upper surface of the track rail 1 having the bolt mounting holes 11. When the moving block 2 moves along the track rail 1, the press-fitting jig 9 is held in slide contact with the upper surface of the track rail 1.

Figure 3:
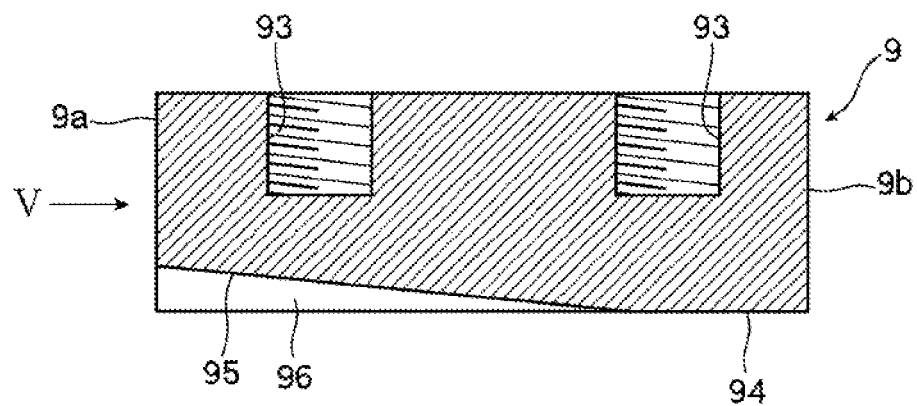
FIG. 3 is a sectional view of the press-fitting jig illustrated in FIG. 1, which is taken along a longitudinal direction of the track rail.
Figure 4:
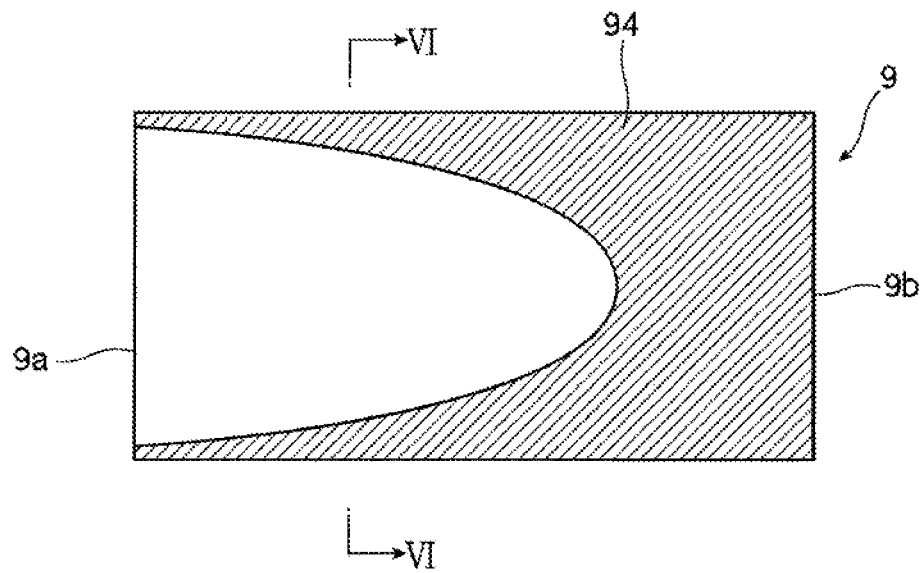
FIG. 4 is a view for illustrating the press-fitting jig illustrated in FIG. 3 as seen in the direction indicated by the arrow IV.

FIG. 3 is a sectional view of the press-fitting jig 9, which is taken along the longitudinal direction of the track rail 1 at centers of the tap holes 93. FIG. 4 is a bottom view for illustrating an abutment surface of the press-fitting jig 9, which is held in abutment against the track rail 1. The press-fitting jig 9 has a finishing surface 94 opposed to the track rail 1, and the finishing surface 94 is brought into slide contact with the upper surface of the track rail 1. In order to prevent the press-fitting jig 9 from damaging the track rail 1 being quenched bearing steel, the press-fitting jig 9 is made of a material softer than the material of the track rail 1. For example, the press-fitting jig 9 is made of brass, gun metal, or synthetic resin. Moreover, in order to secure favorable slidability of the press-fitting jig 9 with respect to the track rail 1, the press-fitting jig 9 itself may be made of oleoresin, or coating achieving excellent smooth sliding such as fluororesin may be formed on the finishing surface 94 brought into contact with the track rail 1.

Moreover, the press-fitting jig 9 has a guide surface 95 configured to gradually push the closure cap 70 temporarily placed in the bolt mounting hole 11 of the track rail 1 into the bolt mounting hole 11. This guide surface 95 is formed adjacent to the finishing surface 94, and is inclined along a longitudinal direction of the press-fitting jig 9 as illustrated in FIG. 3. When the finishing surface 94 is brought into abutment against the upper surface 12 of the track rail 1, a wedge-shaped space 96 is formed between the guide surface 95 and the upper surface of the track rail 1. The wedge-shaped space 96 is opened only in one end surface 9a of the press-fitting jig, and is not opened in another end surface 9b. Thus, the guide surface 95 continues to the finishing surface 94.

Figure 5:
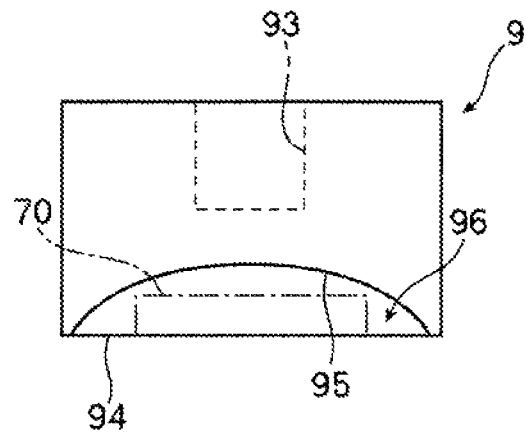
FIG. 5 is a view for illustrating the press-fitting jig illustrated in FIG. 3 as seen in the direction indicated by the arrow V.
Figure 6:
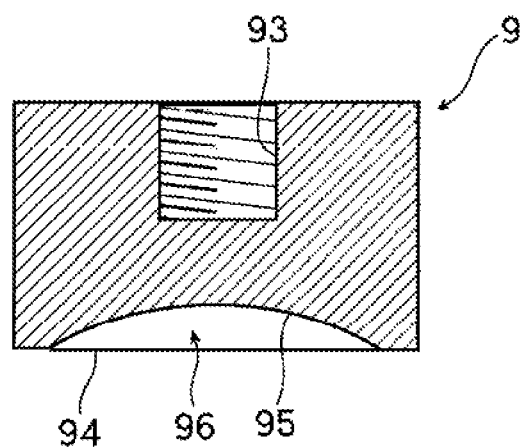
FIG. 6 is a view for illustrating the press-fitting jig illustrated in FIG. 4 as seen in the direction indicated by the arrows VI.

In this embodiment, as illustrated in FIG. 5, when the press-fitting jig 9 is observed in the longitudinal direction, the guide surface 95 is formed into a recessed curved surface shape along a width direction of the track rail 1, and has such a shape of being most recessed from the finishing surface 94 at a center in the width direction. Moreover, both ends of the guide surface 95 continue to the finishing surface 94, and a sectional shape of the wedge-shaped space 96 in the width direction of the press-fitting jig 9 has an arch shape formed by cutting an arc with a chord. Moreover, as mentioned above, the guide surface 95 is inclined in the longitudinal direction of the press-fitting jig 9. Thus, as illustrated in FIG. 6, the size of the cross section of the wedge-shaped space 96 having an arch shape is gradually reduced as separating from the end surface 9a of the press-fitting jig 9. Thus, as illustrated in FIG. 4, when the press-fitting jig 9 is observed in a direction from the finishing surface 94, the guide surface 95 has a shape of being gradually narrowed as separating from the end surface 9a, such as a shape approximate to a half oval shape. In FIG. 4, in order to clarify a boundary between the finishing surface 94 and the guide surface 95, the finishing surface 94 formed on a flat plane is shaded with oblique lines.

The one-dot chain lines in FIG. 5 indicate the closure cap 70 temporarily placed in the bolt mounting hole 11 of the track rail 1. The size of the wedge-shaped space 96 in the end surface 9a of the press-fitting jig 9 is set to a size which allows entry of the closure cap 70 into the wedge-shaped space 96 without causing the closure cap 70 to be caught by the end surface 9a of the press-fitting jig 9 when the press-fitting jig 9 is moved on the track rail 1.

Figure 7:
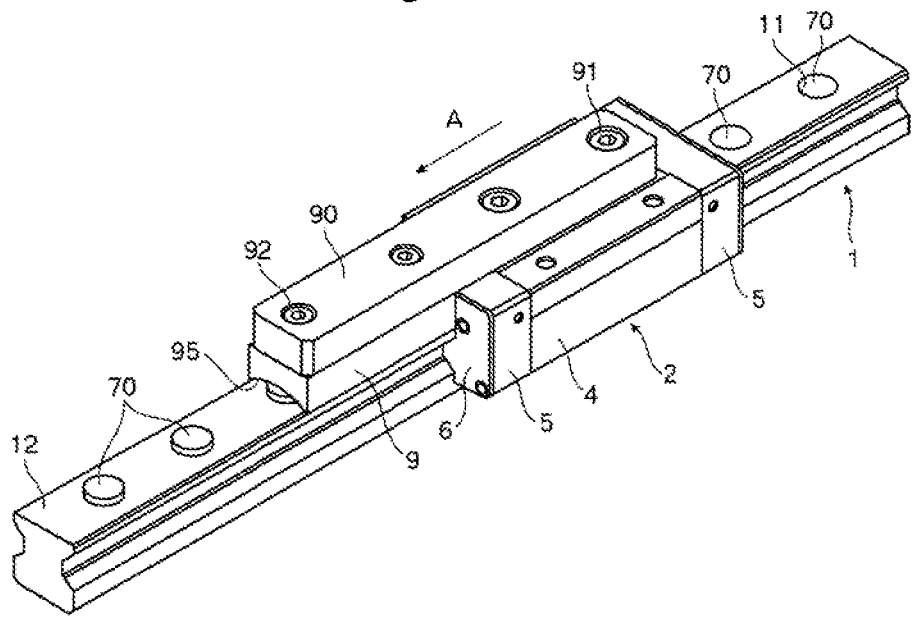
FIG. 7 is a perspective view for illustrating an operation of firmly fitting closure caps with use of the press-fitting jig according to the present invention.

FIG. 7 is a perspective view for illustrating an operation of firmly fitting the closure caps 70 into the bolt mounting holes 11 of the track rail 1.

After installation of the track rail 1 on the base portion 8 is completed, the press-fitting jig 9 is mounted, with use of the holding plate 90, to the moving block 2 assembled to the track rail 1. Next, the closure caps 70 are temporarily placed in the bolt mounting holes 11 of the track rail 1. In such a temporarily mounted state, the closure caps 70 project from the upper surface of the track rail 1.

When the moving block 2 is moved from this state along the track rail 1 in the direction indicated by the arrow A in FIG. 7, the closure cap 70 enters the wedge-shaped space 96 which is present between the guide surface 95 formed in the press-fitting jig 9 and the upper surface 12 of the track rail 1. When the moving block 2 is further moved in the direction A, because the guide surface 95 is inclined in the longitudinal direction of the track rail 1, the closure cap 70 is pressed by the guide surface 95 toward the upper surface 12 of the track rail 1, and the closure cap 70 is gradually pushed into the bolt mounting hole 11 of the track rail 1. Then, after the guide surface 95 passes above the bolt mounting hole 11, the closure cap 70 is completely pushed into the large-diameter portion 11a of the bolt mounting hole 11. After that, the finishing surface 94 of the press-fitting jig 9 passes above the closure cap 70 having been pushed into the bolt mounting hole 11 so that a step formed between a top surface 71 of the closure cap 70 and the upper surface 12 of the track rail 1 is eliminated.

After completion of the press-fitting of the closure caps 70 into all of the bolt mounting holes 11 of the track rail 1, the press-fitting jig 9 and the holding plate 90 are removed from the moving block 2, and the movable body is fixed to the mounting surface 41 of the moving block 2.

Thus, with the press-fitting jig 9 according to the present invention, the press-fitting of the closure caps 70 into the bolt mounting holes 11 can be completed by only moving the moving block 2 having the press-fitting jig 9 mounted thereto along the track rail 1. That is, when the closure caps 70 are temporarily placed in the plurality of bolt mounting holes 11 of the track rail 1, and the moving block 2 is caused to travel along the track rail 1, the closure caps 70 can be successively press-fitted into the bolt mounting holes 11.

At this time, the movement accuracy of the moving block 2 with respect to the track rail 1 is reflected in the movement accuracy of the press-fitting jig 9 with respect to the track rail 1. In view of the primary characteristic of the linear guide device to guide the movable body fixed to the moving block 2 along the track rail 1 with a high accuracy, such accuracy is reflected also in the operation of pushing the closure caps 70 with the press-fitting jig 9, thereby being capable of press-fitting the plurality of closure caps 70 into the bolt mounting holes 11 without operation unevenness.

Moreover, the press-fitting jig 9 is mounted to the moving block 2 with use of the mounting surface 41 of the moving block 2. Therefore, it is not required that any special processing be performed on the moving block 2 before mounting the press-fitting jig 9 to the moving block 2. Moreover, the press-fitting jig 9 can be mounted to the moving block 2 with an accuracy equal to the accuracy of mounting the movable body to the moving block 2.

Further, in the embodiment of the press-fitting jig 9 illustrated in the drawings, the guide surface 95 is formed into the recessed curved surface shape along the width direction of the track rail 1, and the both ends of the guide surface 95 continue to the finishing surface 94 brought into slide contact with the upper surface 12 of the track rail 1. The size of the wedge-shaped space 96 is gradually reduced as separating from the end surface 9a of the press-fitting jig 9. Therefore, when the closure caps 70 are pushed into the bolt mounting holes 11 along with the advancement of the moving block 2, the guide surface 95 is brought into contact with two positions in the vicinity of a diameter portion of the closure cap 70 to press the closure cap 70. Thus, at the time of pushing the closure cap 70 into the bolt mounting hole 11 of the track rail 1, the closure cap 70 can be prevented from being pressed in an inclined state as much as possible, thereby being capable of preventing a problem in that the top surface 71 of the closure cap 70 having been press-fitted is inclined with respect to the upper surface 12 of the track rail 1 and a problem in that a peripheral portion of the closure cap 70 is partially shaved to cause formation of burrs at the time of press-fitting of the closure cap 70.

Figure 8:
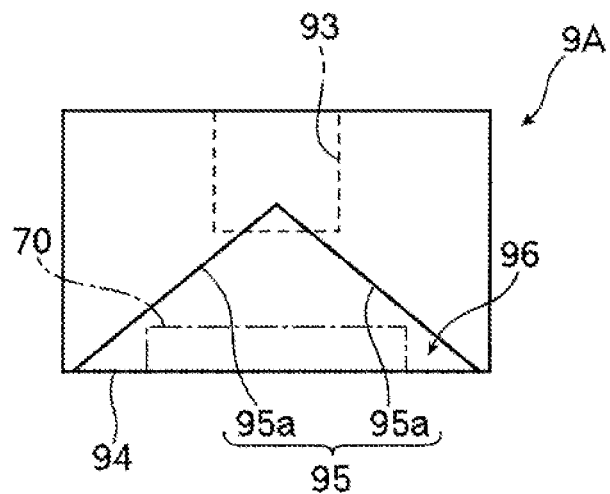
FIG. 8 is a side view for illustrating a press-fitting jig according to a second embodiment of the present invention.
Figure 9:
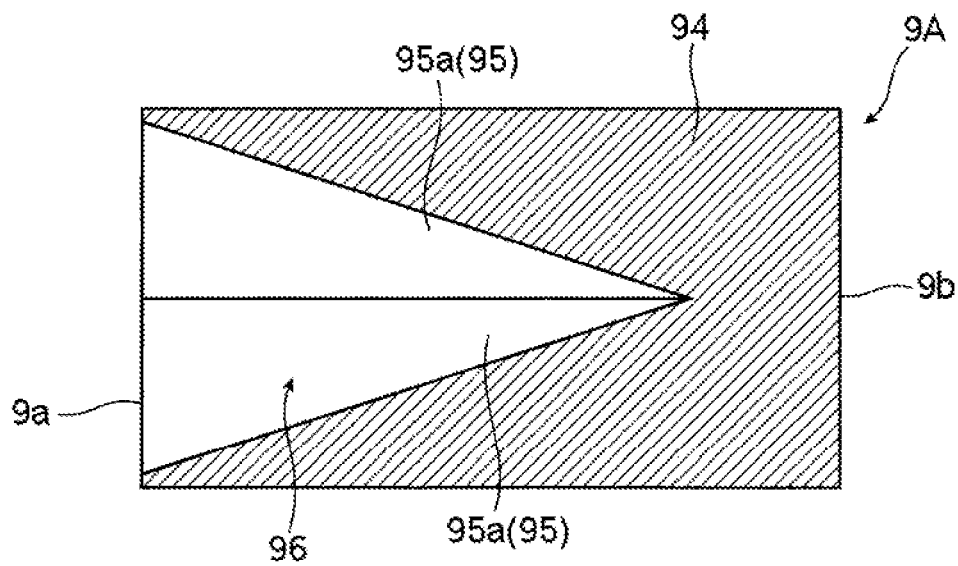
FIG. 9 is a bottom view of the press-fitting jig according to the second embodiment.

FIG. 8 and FIG. 9 are views for illustrating the press-fitting jig according to a second embodiment of the present invention. Similarly to FIG. 5, FIG. 8 is an illustration of the press-fitting jig as observed in the longitudinal direction of the track rail 1. Similarly to FIG. 4, FIG. 9 is an illustration of an abutment surface of the press-fitting jig, which is brought into abutment against the track rail 1. Components which are the same as those of the press-fitting jig according to the first embodiment illustrated in FIG. 3 to FIG. 6 are denoted by the same reference symbols in FIG. 8 and FIG. 9, and detailed description of those components is omitted. In FIG. 9, in order to clarify a boundary between the finishing surface 94 and the guide surface 95, the finishing surface 94 formed on a flat plane is shaded with oblique lines.

In the press-fitting jig 9 according to the first embodiment described above, the guide surface is formed into the recessed curved surface shape. However, in a press-fitting jig 9A according to the second embodiment, the guide surface 95 is formed of a pair of pressing flat surfaces 95a intersecting each other. The pressing flat surfaces 95a are inclined at the same angle with respect to the finishing surface 94 and intersect each other. When the finishing surface 94 of the press-fitting jig 9A is brought into abutment against the track rail 1, a wedge-shaped space 96 is formed between the pair of pressing flat surfaces 95a and the upper surface 12 of the track rail 1. As illustrated in FIG. 8, a sectional shape of the wedge-shaped space 96 in the width direction of the press-fitting jig 9 is a triangular shape. Moreover, as illustrated in FIG. 9, when the wedge-shaped space 96 is observed from the track rail 1 side, the pressing flat surfaces 95a each have a triangular shape, and the wedge-shaped space 96 has a shape of an isosceles triangle which is gradually narrowed as separating from the end surface 9a of the press-fitting jig 9.

Also with the press-fitting jig 9A according to the second embodiment having such configuration, when the closure caps 70 are pushed into the bolt mounting holes 11 along with the advancement of the moving block 2, the guide surface 95 formed of the pair of pressing flat surfaces 95a is brought into contact with two positions in the vicinity of a diameter portion of the closure cap 70 to press the closure cap 70. Thus, the closure cap 70 can be prevented from being pressed in an inclined state as much as possible. Moreover, the guide surface 95 is formed of a combination of a pair of flat surfaces. Therefore, the guide surface 95 can be processed more easily as compared to the press-fitting jig 9 according to the first embodiment in which the guide surface 95 is formed into the recessed curved surface shape.

Figure 10:
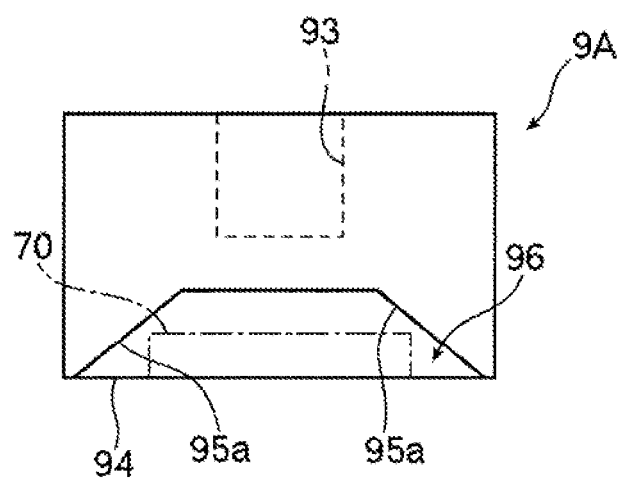
FIG. 10 is a side view for illustrating a modification example of the press-fitting jig according to the second embodiment.

In the press-fitting jig 9A according to the second embodiment, as illustrated in FIG. 8, the sectional shape of the wedge-shaped space 96 in the width direction of the press-fitting jig 9A is a triangular shape. However, as long as the pair of pressing flat surfaces 95a being inclined with respect to the finishing surface 94 are formed, for example, as illustrated in FIG. 10, the sectional shape of the wedge-shaped space 96 in the width direction of the press-fitting jig 9A may be a trapezoidal shape.

Moreover, the linear guide device illustrated in FIG. 1 is merely an example, and a guide device to which the press-fitting jig according to the present invention is applicable is not limited to this. However, it is required that a moving block mounted to a track rail have a capability to bear a reaction force which acts on the press-fitting jig at the time of pushing the closure caps into the bolt mounting holes and continuously hold the press-fitting jig in abutment against the track rail.

The invention claimed is:

1. A press-fitting jig for a closure cap, the press-fitting jig being configured to press-fit a closure cap into a bolt mounting hole formed in a track rail of a guide device,
the press-fitting jig being mounted to a moving block, which is assembled to the track rail through intermediation of a plurality of rolling elements, and is configured to move on the track rail,
the press-fitting jig comprising:
a finishing surface which is brought into slide contact with an upper surface of the track rail having the bolt mounting hole opened therein; and
a guide surface, which is formed adjacent to the finishing surface and is inclined along a longitudinal direction of the track rail to form a wedge-shaped space with the track rail, the guide surface being configured to push the closure cap temporarily placed in the bolt mounting hole into the bolt mounting hole along with movement of the moving block,
wherein the guide surface is formed into a recessed curved surface shape along a width direction of the track rail,
wherein a sectional shape of the wedge-shaped space along the width direction of the track rail is an arch shape, and
wherein a size of the arch shape of the sectional shape of the wedge-shaped space is gradually reduced from an end surface of the press-fitting jig both in a width direction of the track rail and in a longitudinal direction of the track rail.

2. The press-fitting jig for a closure cap according to claim 1, wherein the press-fitting jig is mounted to the moving block with a holding plate fixed to a mounting surface for mounting a movable body to the moving block.

3. A press-fitting jig for a closure cap, the press-fitting jig being configured to press-fit a closure cap into a bolt mounting hole formed in a track rail of a guide device,
   the press-fitting jig being mounted to a moving block, which is assembled to the track rail through intermediation of a plurality of rolling elements, and is configured to move on the track rail,
   the press-fitting jig comprising:
   a finishing surface which is brought into slide contact with an upper surface of the track rail having the bolt mounting hole opened therein; and
   a guide surface, which is formed adjacent to the finishing surface and is inclined along a longitudinal direction of the track rail to form a wedge-shaped space with the track rail, the guide surface being configured to push the closure cap temporarily placed in the bolt mounting hole into the bolt mounting hole along with movement of the moving block,
   wherein the guide surface has a pair of pressing flat surfaces inclined with respect to the finishing surface,
   wherein a sectional shape of the wedge-shaped space along a width direction of the track rail is a triangular shape, and
   wherein a size of the triangular shape of the sectional shape of the wedge-shaped space is gradually reduced from an end surface of the press-fitting jig both in a width direction of the track rail and in a longitudinal direction of the track rail.

4. The press-fitting jig for a closure cap according to claim 3, wherein the press-fitting jig is mounted to the moving block with a holding plate fixed to a mounting surface for mounting a movable body to the moving block.

* * * * *